United States Patent
Kuo et al.

(10) Patent No.: US 10,488,212 B2
(45) Date of Patent: Nov. 26, 2019

(54) METHOD FOR TRACKING AND NAVIGATING A GROUP

(71) Applicant: Taipei ANJET Corporation, Taipei (TW)

(72) Inventors: Chien Liang Kuo, Hong Kong (CN); Hai Fang Liu, Hong Kong (CN)

(73) Assignee: TAIPEI ANJET CORPORATION, Taipei (TW)

( * ) Notice: Subject to any disclaimer, the term of this patent is extended or adjusted under 35 U.S.C. 154(b) by 184 days.

(21) Appl. No.: 15/787,139

(22) Filed: Oct. 18, 2017

(65) Prior Publication Data

US 2019/0113352 A1 Apr. 18, 2019

(51) Int. Cl.
*G01C 21/34* (2006.01)
*G01C 21/36* (2006.01)
*H04W 4/08* (2009.01)

(52) U.S. Cl.
CPC ..... *G01C 21/3438* (2013.01); *G01C 21/3415* (2013.01); *G01C 21/3647* (2013.01); *G01C 21/3667* (2013.01); *H04W 4/08* (2013.01)

(58) Field of Classification Search
CPC ............ G01C 21/3438; G01C 21/3415; G01C 21/3647; G01C 21/3667; H04W 4/08
See application file for complete search history.

(56) References Cited

U.S. PATENT DOCUMENTS

| | | | | |
|---|---|---|---|---|
| 8,320,939 B1 * | 11/2012 | Vincent | ................... | G01S 19/48 455/456.1 |
| 9,560,426 B1 * | 1/2017 | Daniel | .................. | H04L 67/125 |
| 2003/0012149 A1 * | 1/2003 | Maggenti | ................ | H04L 69/04 370/260 |
| 2007/0229350 A1 * | 10/2007 | Scalisi | .................. | H04W 4/021 342/350 |
| 2010/0141393 A1 * | 6/2010 | Daniel | ..................... | A43B 3/00 340/10.3 |
| 2015/0233725 A1 * | 8/2015 | Harris | ................ | G01C 21/3492 701/487 |
| 2015/0365448 A1 * | 12/2015 | Stifelman | ............. | G06F 16/444 709/204 |
| 2017/0092090 A1 * | 3/2017 | Lerner | ............... | G06K 7/10366 |
| 2017/0323227 A1 * | 11/2017 | Sadeghi | ................ | G07F 17/246 |
| 2018/0075747 A1 * | 3/2018 | Pahwa | .................. | B60W 40/09 |

* cited by examiner

*Primary Examiner* — Mussa A Shaawat

(74) *Attorney, Agent, or Firm* — Muncy, Geissler, Olds & Lowe, P.C.

(57) ABSTRACT

In a method for tracking and navigating a group, a virtual interface is firstly used to provide a path group. Then, a plurality of members joins the path group through the virtual interface and one of the majority of members observes the position of each of the plurality of members. A plurality of navigating paths are respectively established according to positions of the plurality of members, so as to navigate the plurality of members to a destination of the path group. A plurality of mark points are designated in the navigating path of each of the plurality of members. Each of the plurality of members moves in the navigating path corresponded thereof. A warning signal is generated when the member diverges from the navigating path corresponded thereof or the member does not reach the destination. The plurality of members reach the destination to complete a tracking and navigating process.

10 Claims, 5 Drawing Sheets

METHOD FOR TRACKING AND NAVIGATING A GROUP

BACKGROUND OF THE INVENTION

Field of the Invention

The present invention relates to a method for using a system to navigate members to a destination, particularly to a method for tracking and navigating a group consisting of multiple members.

Description of the Related Art

With the popularity of mobile electronic devices, such as smarts phones or table computers, many application (App) programs installed in the devices are developed. The mobile electronic device links to the Internet to execute application programs, such as a global positioning system (GPS) app, a messenger app, or an on-line game. Alternatively, the mobile electronic device directly executes application programs, such as a clock app, a note app, or a camera app. Thus, users use hand-held mobile electronic devices to install personal application programs as helpers in their life.

Many application programs are developed to improve the inconvenience of life. For example, a user difficulty finds a desirable destination in a strange area. If the user has to reach the destination in a limited period, the user will easily feel pressure or take the wrong road. Alternatively, in an emergence case, traffic accidents are caused on the user. In such a case, a GPS app may be executed to overcome the abovementioned problems. The user also uses an application program to communicate with friends in a strange area, such as inputting vocal messages or word messages. However, when many people in different positions want to reach the same destination, they cause difficulty in communicating with each other and knowing each other's positions and how to leave for the destination. Since too many cooks spoil the broth, there is a misunderstanding in information communication. When people do not be familiar with how to connect their positions to the destination, a GPS app may be executed. Although the GPS app is convenient for the user, people does not necessarily understand navigating paths provided by the GPS app. When one sets the wrong destination, the wrong destination is difficulty observed at the first time. It is observed that someone takes the wrong road until time is up. As a result, it has to cost a lot of efforts and time to navigate many people to the same destination within a limited period.

To overcome the abovementioned problems, the present invention provides a system and a method for tracking and navigating a group, so as to help members of the group reach the same destination.

SUMMARY OF THE INVENTION

A primary objective of the present invention is to provide a method for tracking and navigating a group, which establishes paths to navigate different members to a common destination according to positions of the members. When the member diverges from the path, a warning signal is generated. The members can observe each other's positions, lest the wrong destination be set or the wrong road be taken.

Another objective of the present invention is to provide a method for tracking and navigating a group, which more easily navigates members to a destination in a segmental-designating way. The navigation function of the segmental-designating way is more effective than that of the conventional map-navigating technology.

To achieve the abovementioned objectives, the present invention provides a method for tracking and navigating a group, which comprises: using a virtual interface to provide a path group; a plurality of members joining the path group through the virtual interface and one of the plurality of members observing the position of each of the plurality of members; respectively establishing a plurality of navigating paths according to positions of the plurality of members, so as to navigate the plurality of members to a destination of the path group; designating a plurality of mark points in the navigating path of each of the plurality of members; each of the plurality of members moving in the navigating path corresponded thereof, and generating a warning signal when the member diverges from the navigating path corresponded thereof or the member does not reach the mark point; and the plurality of members reaching the destination to complete a tracking and navigating process.

In an embodiment of the present invention, the virtual interface is a mobile application (App) program built in a mobile electronic device.

In an embodiment of the present invention, the mobile electronic device is a smart phone or a tablet computer.

In an embodiment of the present invention, the time of reaching the destination of the path group and the plurality of mark points of the navigating path is set.

In an embodiment of the present invention, when one of the plurality of members does not reach the destination or the mark point at the time, the warning signal is generated. After one of the plurality of members reaches the mark point, at least one mark datum is edited for the mark point. For example, the mark datum is edited by capturing images.

In an embodiment of the present invention, one of the plurality of members observes the position of each of the plurality of members on an electronic map. One of the plurality of members broadcasts calling messages on the electronic map.

In an embodiment of the present invention, the plurality of members transmit word messages or vocal messages to communicate with each other.

Below, the embodiments are described in detail in cooperation with the drawings to make easily understood the technical contents, characteristics and accomplishments of the present invention.

DETAILED DESCRIPTION OF THE INVENTION

In society, each of people of all ages including old persons and students has a mobile electronic device. The mobile electronic device may be a smart phone or a tablet computer, which is provided to members for using application programs to perform various functions, such as telephoning, searching data, or chatting.

Figure 1:
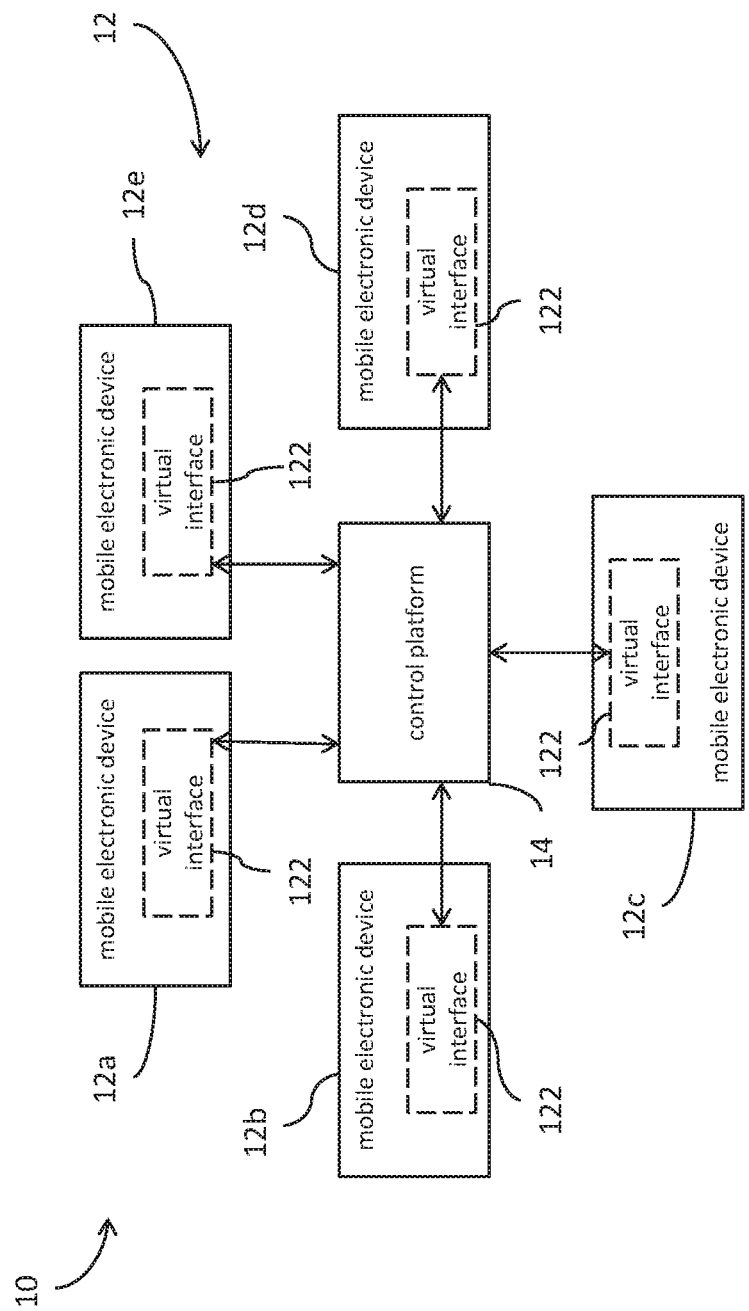
FIG. 1 is a block diagram showing a system for tracking and navigating a group according to an embodiment of the present invention.

Refer to FIG. 1. A system 10 for navigating and tracking a group comprises a plurality of mobile electronic devices 12. In the embodiment, the mobile electronic device 12 may be a smart phone or a tablet computer. Besides, five mobile electronic devices 12a, 12b, 12c, 12d, and 12e are exemplified. Each of the mobile electronic devices 12a, 12b, 12c, 12d, and 12e is wirelessly connected with a control platform 14 through a virtual interface 122, thereby establishing a communication platform. In the embodiment, the virtual interface 122 may be a mobile application (App) program built in a mobile electronic device and the control platform 14 may be a cloud server. Users use the virtual interfaces 122 to wirelessly connect to each other through the control platform 14.

Figure 2:
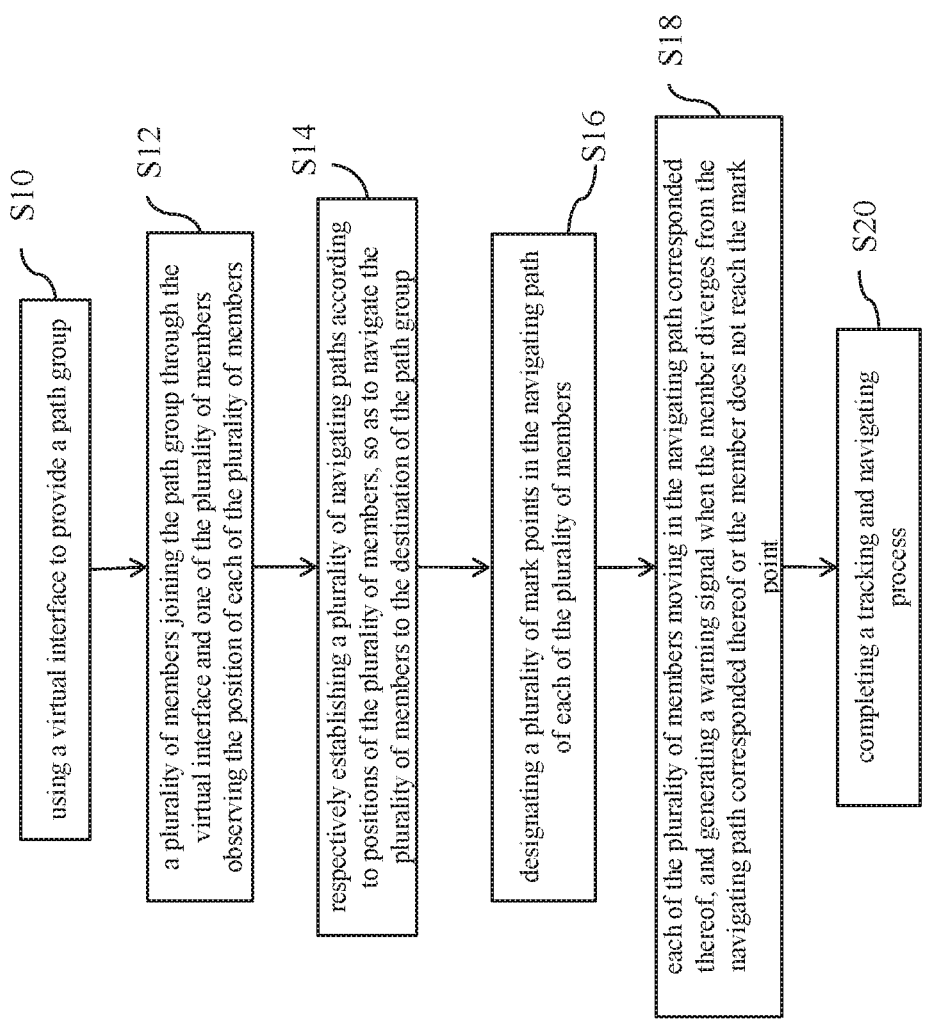
FIG. 2 is a flowchart showing a method for tracking and navigating a group according to an embodiment of the present invention.
Figure 3:
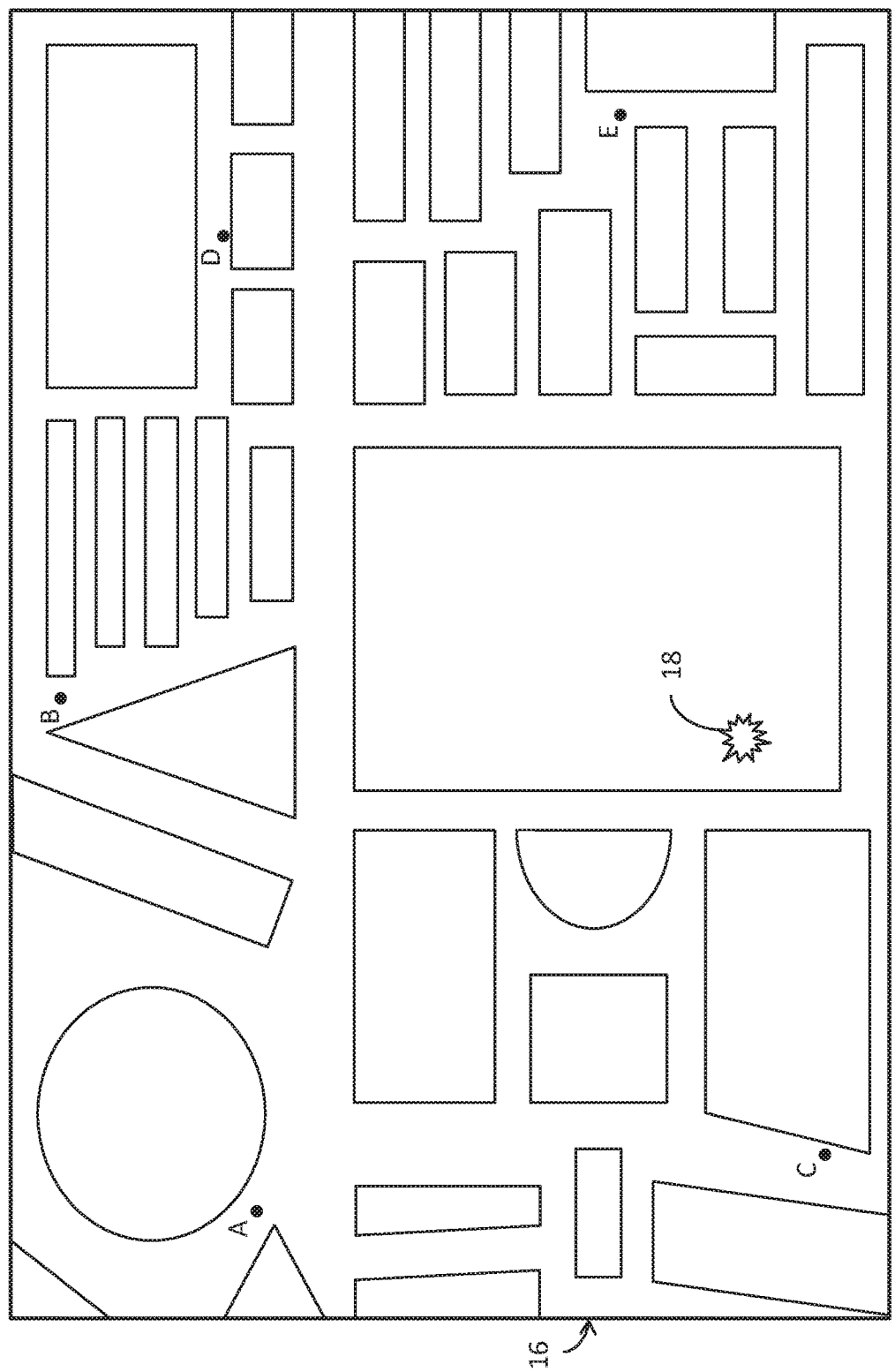
FIGS. 3-5 are diagrams showing the operation of an electronic map according to an embodiment of the present invention.

Afterwards, a method for navigating and tracking a group is explained in detail. Refer to FIG. 1 and FIG. 2. Firstly, in Step S10, a user uses the mobile electronic devices 12a, 12b, 12c, 12d, or 12e to execute a virtual interface 122 and uses the virtual interface 122 to provide a path group. In Step S12, after the path group is produced, the user has the access to add members to the path group. The user may actively select members to join the path group. Alternatively, the path group is open to anyone to join. The present invention should not be limited to a way of joining the group and the number of members joining the group. In FIG. 3, the mobile electronic devices 12a, 12b, 12c, 12d, and 12e respectively correspond to five members A, B, C, D, and E. The number of the members may be multiple. When the members A, B, C, D, and E join the path group through the virtual interfaces 122 of the mobile electronic devices 12a, 12b, 12c, 12d, or 12e, positions of the members A, B, C, D, and E are displayed on an electronic map 16. One of the plurality of members A, B, C, D, and E observes the position of each of the plurality of members A, B, C, D, and E on the electronic map 16. On the electronic map 16, one of the plurality of members A, B, C, D, and E broadcasts calling messages, such as inputting a vocal message or a word message. Thus, the members A, B, C, D, and E communicate with each other through vocal messages or word messages.

Figure 4:
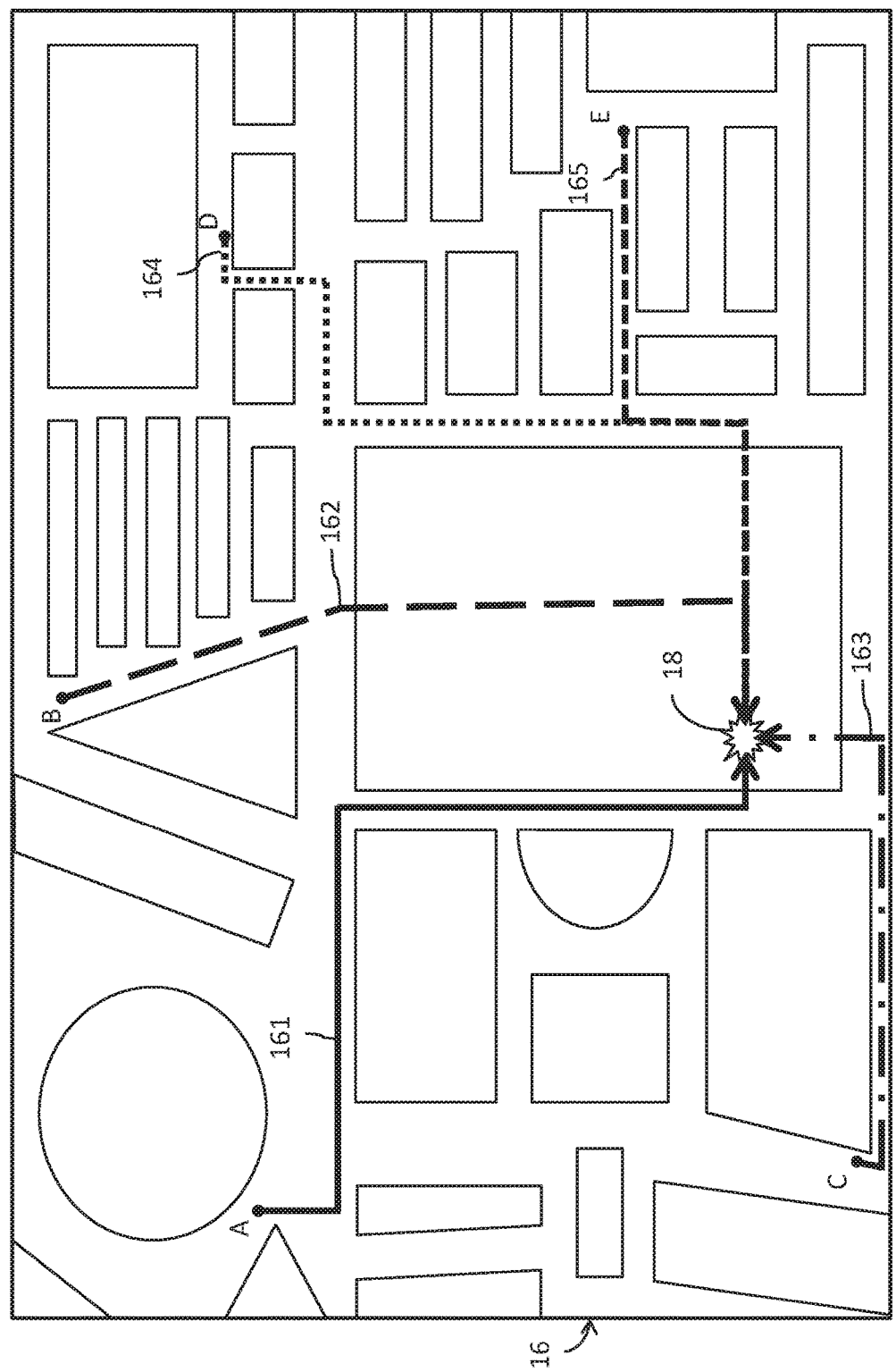
Figure 5:
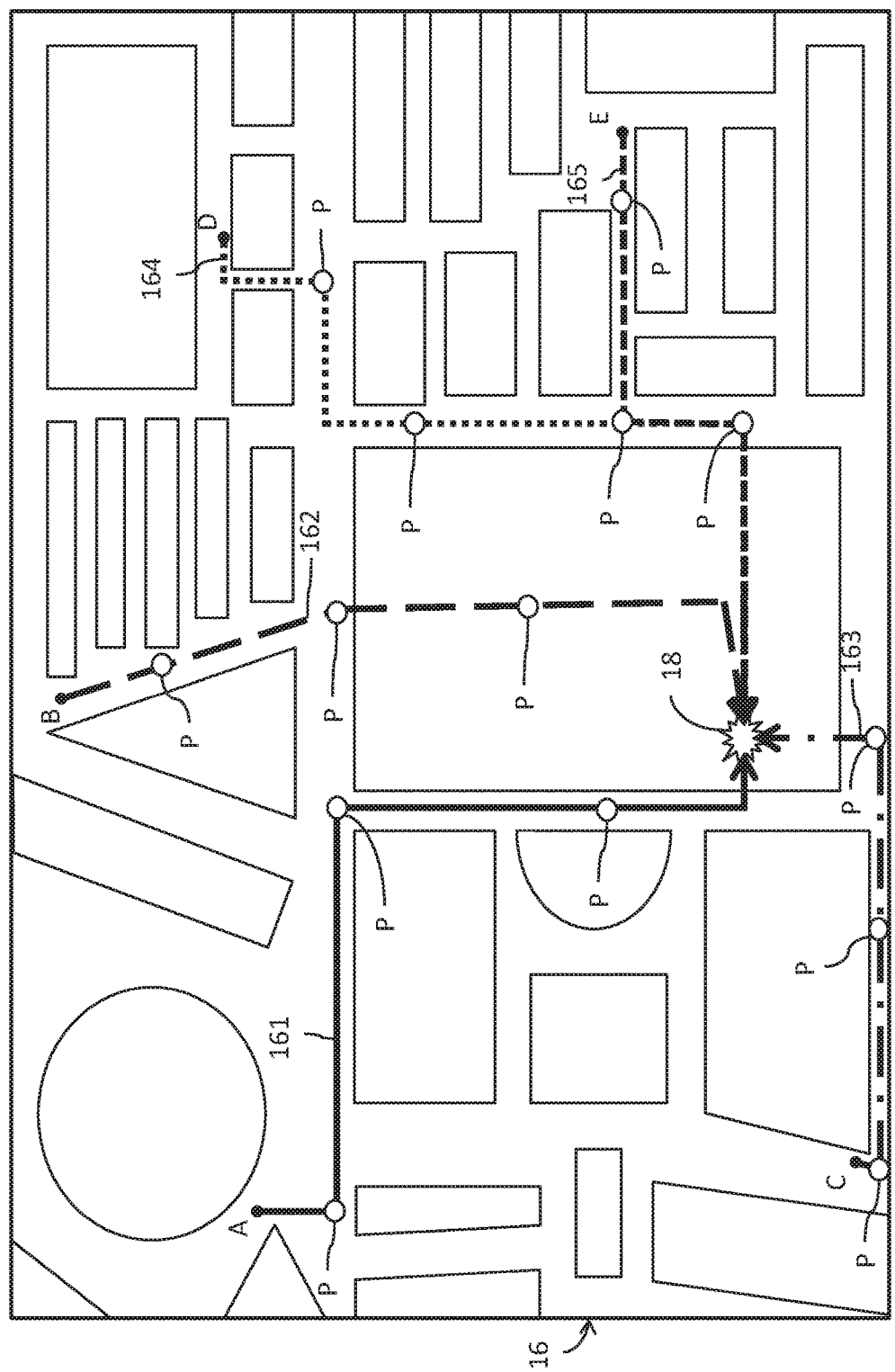

Continuing from the abovementioned paragraph, FIG. 4 is referred. In Step S14, on the electronic map 16 of the virtual interface 22, navigating paths 161, 162, 163, 164, and 165 are respectively established according to the positions of the members A, B, C, D, and E, so as to navigate the members A, B, C, D, and E to the destination of the path group. The navigating paths 161, 162, 163, 164, and 165 may separate or overlap due to the positions of the members A, B, C, D, and E. Refer to FIG. 5. In Step S16, a plurality of mark points P are designated in the navigating path 161, 162, 163, 164, or 165 of each of the plurality of members A, B, C, D, and E. The present invention should not be limited to the number of the mark points P designated in the navigating path 161, 162, 163, 164, or 165. The number of the mark points P is adaptable according to the length of the path. In Step S18, the members A, B, C, D, and E respectively move in the navigating path 161, 162, 163, 164, or 165. When the member A, B, C, D, or E diverges from the navigating path 161, 162, 163, 164, or 165 corresponded thereof or the member A, B, C, D, or E does not reach the mark point P within a limited period, a warning signal is generated. The warning signal may be sound, vibration, or words on a screen. In Step S20, the members A, B, C, D, and E reach the destination 18 to complete a tracking and navigating process.

The present invention uses a virtual interface to gather many members in different places, navigates the members to the same destination, and provides a warning signal or a real-time communication interface lest someone take the wrong road or do not reach the destination within a limited period. As a result, in addition to setting the time of reaching the destination, the time of reaching the mark points in the navigating path is set to warn the member. The members move according to the mark points, lest someone take the wrong road or do not reach the destination within a limited period. Even if the member does not find the correct road or the destination, the member sets a help item on the virtual interface, such that the other members immediately understand a problem with the help item and provides vocal messages or word messages for the member in difficulty. After one of the members reaches the mark point, the member uses the virtual interface to edit mark data for the mark point. For example, the description of whether a traffic jam or a dangerous event occurs near the mark point is written down and provided to the members possibly passing through the mark point. Besides, the member alternatively uses the mobile electronic device to take a picture, such as taking the picture of a dangerous place. The mark data is edited by capturing images. Or otherwise, the important landmark near the mark point is captured, so that the other members more easily find the landmark. Alternatively, the scenery or local idiom of the landmark is introduced to achieve more purposes.

Accordingly, the method for tracking and navigating the group of the present invention can share messages and the position of everyone, perform vocal communication and navigate members. When the destination is set or varied, the members of the group immediately know the destination. The method of the present invention does not inform the members one by one. The fact that someone inputs the wrong destination is not worried about. When a dangerous or congested road is observed from the mark data, a user can change the original path and find a shorter path. When the mark data is edited, the scenery and local idiom of the navigating path are introduced. In other words, the mark data for the mark points of the navigating path is edited, whereby the method for tracking and navigating the group tracks the positions of the members, navigates the members to the destination and improves the practicality of life.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A method for tracking and navigating a group comprising:
    using a virtual interface to provide a path group;
    a plurality of members joining the path group through the virtual interface and one of the plurality of members observing a position of each of the plurality of members;
    respectively establishing a plurality of navigating paths according to positions of the plurality of members, so as to navigate the plurality of members to a destination of the path group;
    designating a plurality of mark points in the navigating path of each of the plurality of members;
    each of the plurality of members moving in the navigating path corresponded thereof, and generating a warning signal when the member diverges from the navigating path corresponded thereof or the member does not reach the mark point; and the plurality of members reaching the destination to complete a tracking and navigating process.

2. The method for tracking and navigating the group according to claim 1, wherein the virtual interface is a mobile application (App) program built in a mobile electronic device.

3. The method for tracking and navigating the group according to claim 2, wherein the mobile electronic device is a smart phone or a tablet computer.

4. The method for tracking and navigating the group according to claim 1, wherein time of reaching the destination of the path group and the plurality of mark points of the navigating path is set.

5. The method for tracking and navigating the group according to claim 4, wherein when one of the plurality of members does not reach the destination or the mark point at the time, the warning signal is generated.

6. The method for tracking and navigating the group according to claim 1, wherein after one of the plurality of members reaches the mark point, at least one mark datum is edited for the mark point.

7. The method for tracking and navigating the group according to claim 6, wherein the at least one mark datum is edited by capturing images.

8. The method for tracking and navigating the group according to claim 1, wherein one of the plurality of members observes the position of each of the plurality of members on an electronic map.

9. The method for tracking and navigating the group according to claim 8, wherein one of the plurality of members broadcasts calling messages on the electronic map.

10. The method for tracking and navigating the group according to claim 1, wherein the plurality of members transmit word messages or vocal messages to communicate with each other.

* * * * *